United States Patent [19]

Backlin

[11] 4,265,495

[45] May 5, 1981

[54] ENGINE BLOCK AND CRANKSHAFT BEARING SEAL

[75] Inventor: Robert R. Backlin, Dolton, Ill.

[73] Assignee: Allis-Chalmers Corporation, Milwaukee, Wis.

[21] Appl. No.: 68,173

[22] Filed: Aug. 20, 1979

[51] Int. Cl.³ .................... F16C 9/02; F16C 35/02
[52] U.S. Cl. .................... 308/23; 308/36.1; 123/195 C
[58] Field of Search .......... 308/23, 36.1, 36.2, 308/74, 122, 167, 240; 123/195 C

[56] References Cited

U.S. PATENT DOCUMENTS

| | | | |
|---|---|---|---|
| 2,655,135 | 10/1953 | Dalenberg | 308/23 |
| 2,657,675 | 11/1953 | McGowen | 123/195 C |
| 2,746,429 | 5/1956 | Vann | 308/23 |
| 2,914,038 | 11/1959 | McKellar | 308/23 |
| 2,969,779 | 1/1961 | Hauser | 308/23 |
| 3,202,463 | 8/1965 | Fatt | 308/23 |
| 3,353,832 | 11/1967 | Coulson | 308/23 |

Primary Examiner—Richard R. Stearns
Attorney, Agent, or Firm—Arthur L. Nelson

[57] ABSTRACT

An engine block and crankshaft bearing seal sealing the main bearing cap with the block and the periphery of the crankshaft.

10 Claims, 4 Drawing Figures

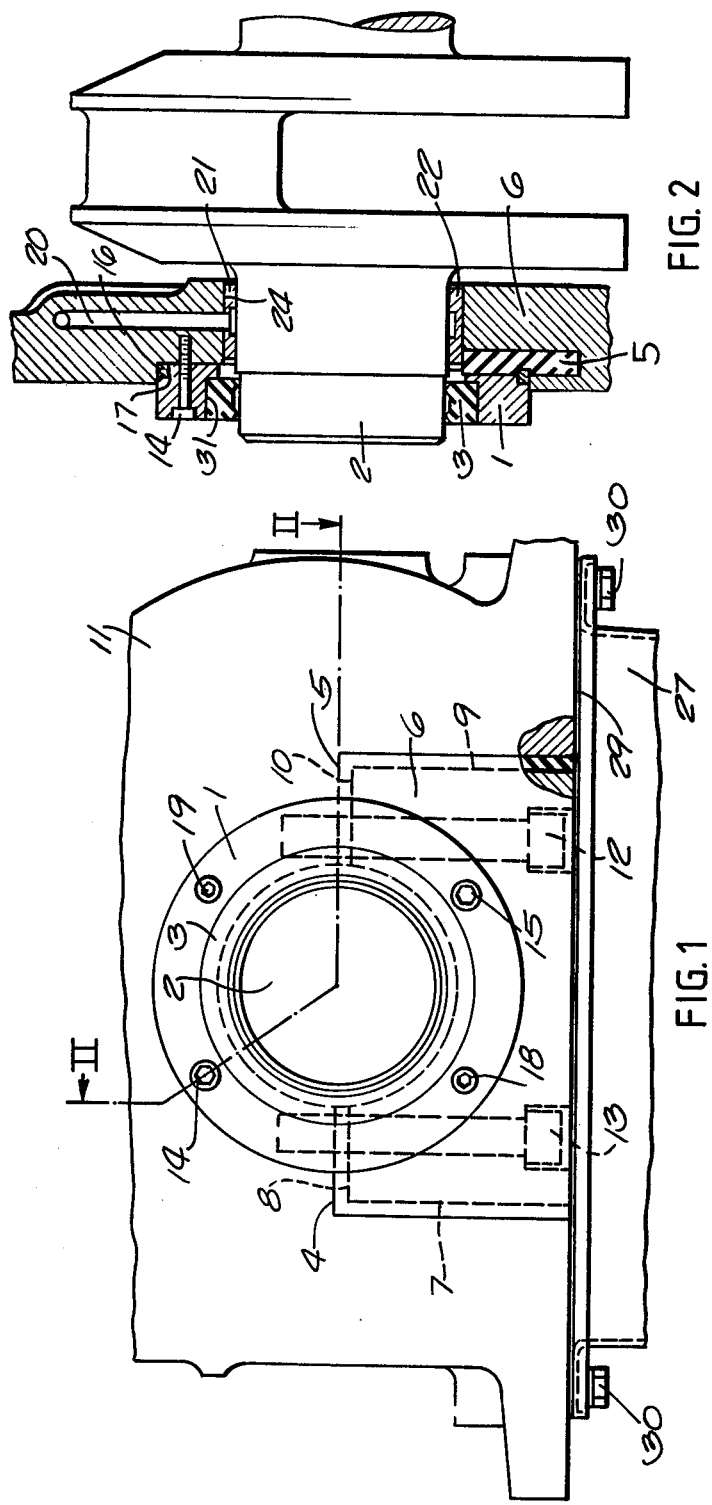

ENGINE BLOCK AND CRANKSHAFT BEARING SEAL

This invention relates to a crankshaft and engine block sealing arrangement and more particularly to a seal assembly for sealing the bearing cap with the engine block in combination with a crankshaft seal where the shaft extends through the end main bearing externally of the engine block.

The crankshafts of reciprocating engines, compressors and related machinery have a plurality of main bearings for supporting the crankshaft. Normally, the crankshaft main bearings are mounted over an oil reservoir and forced lubrication is provided for the crankshaft main bearings and the crankpin bearings. Bearing caps are provided with the block to form the main bearings which are removable to allow disassembly of the crankshaft from the block. The end bearing is formed with a split between the bearing cap and the end wall of the block. To avoid any leakage from the assembly, the applicant has provided L-shaped seals engaging the mating side surfaces of the bearing cap and the block with a portion of the sealing surfaces lying in an extended diammetrical position extending from a peripheral seal around the crankshaft. A seal carrier carries the peripheral seal which presses against the side of the L-shaped seals to form a continuous seal around the bearing cap and the crankshaft. This provision of a continuous seal will prevent any fluid from leaking through the walls of the block around the crankshaft or the bearing cap.

The arrangement as shown provides for a gasket between the oil pan and the block which forms a continuation of the seal around the bearing cap to prevent any oil leakage from the engine at this point.

Accordingly, it is an object of this invention to provide a crankshaft bearing assembly seal with linear sealing between the bearing cap and the engine block to a peripheral seal around the crankshaft.

It is another object of this invention to provide a crankshaft bearing seal with linear sealing between the bearing cap and the supporting structure for the crankshaft.

It is a further object of this invention to provide a crankshaft bearing seal with a seal carrier ring and a block with linear seals between a bearing cap and the block for sealing the complementary surfaces between the engine block and bearing cap of the periphery around the crankshaft to provide continuity of seal around all replaceable components.

The objects of this invention are accomplished by providing a replaceable bearing cap which is mounted on the engine block to form the end main bearing on the engine housing. The bearing cap is replaceable and forms a split with the engine block. Normally, the oil pan is positioned immediately under the bearing cap which is bolted to the block and a gasket is positioned between the oil pan and the engine block to form a fluid tight seal. The invention provides a seal around the crankshaft at the end of the block to form a continuous seal on the crankshaft. An O-ring seal is carried on a seal carrier ring and abuts against an annular surface to form a fluid tight seal. Likewise, the split between the bearing cap and the engine block forms an L-shaped configuration on opposing sides of the crankshaft. A seal groove is provided to receive L-shaped seals and the O-ring seal groove and L-shaped seal grooves partially intersect causing an interference between the two seals. A continuous seal arrangement is provided around the crankshaft and extends from the O-ring seal transversely and vertically at the parting split between the bearing cap and the engine block. The gasket between the oil pan and the block, as well as the bearing cap, provides a continuous seal around the oil pan which also abuts the end of the L-shaped seals to form continuous sealing around the bearing cap.

FIG. 1 is an end view of the bearing and seal assembly;

FIG. 2 is a cross section view taken on line II—II of FIG. 1;

Figure 3:
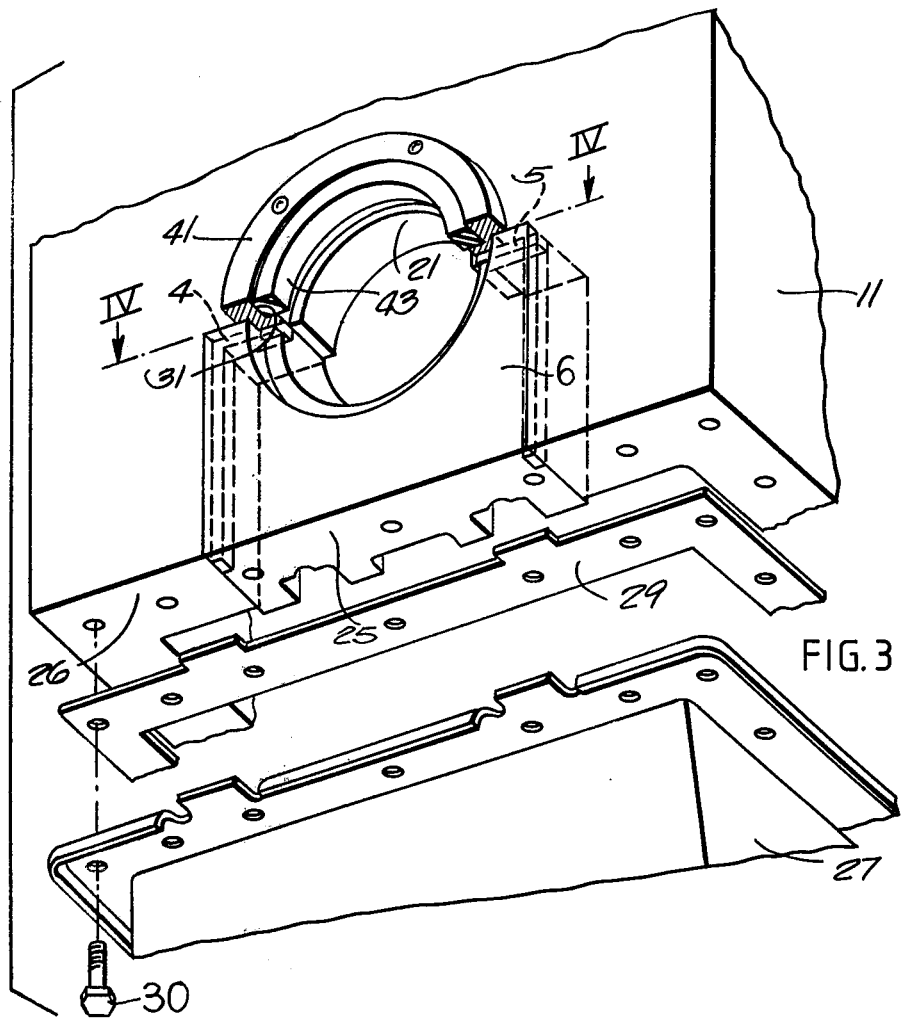
FIG. 3 is a three dimensional view showing a bearing assembly and seal arrangement.

Referring to the drawings, the preferred embodiments of this invention are illustrated. FIG. 1 shows an end view of the bearing assembly in which a seal carrier ring 1 encircles the crankshaft 2. The crankshaft seal 3 is mounted in the seal carrier ring and engages the crankshaft 2. Linear seals 4 and 5 form an L-shaped configuration around the lateral surfaces and upper surface of the bearing cap 6, seals 4 and 5 may be either one, two or more pieces. The linear seals extend diammetrically from the crankshaft 2 in seal grooves 7 and 8 as well as 9 and 10 of the bearing cap 6. The bearing cap 6 is fastened to the block 11 by the bolts 12 and 13.

The seal carrier ring 1 is fastened by the bolts 14, 15, 18 and 19 which compress the O-ring seal 16 which is seated in the annular recess 17. The seal carrier could also be merely press fitted into the block and cap assembly.

Normally, pressurized lubrication is supplied through the passage 20, through the bearing shell 21. Bearing shell 21 is received in the arcuate recess 24 of the housing 11. The bearing shell 22 is received in the bearing cap 6. The bearing shells 21 and 22 form the journal for the shaft 2.

Figure 4:
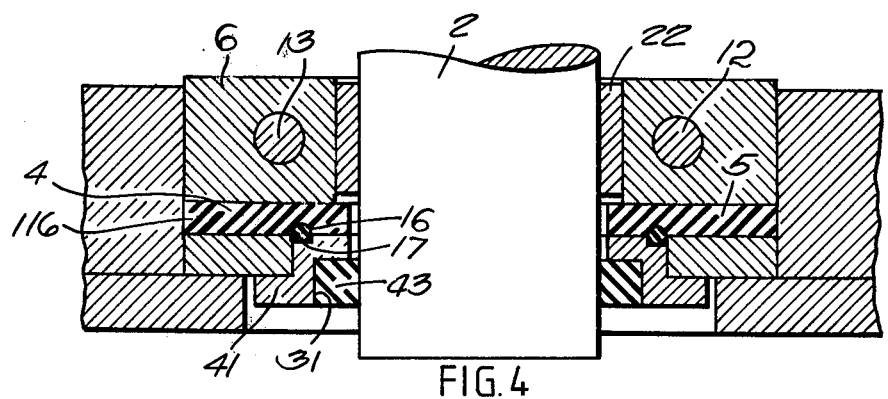
FIG. 4 is cross section view taken on line IV—IV of FIG. 3.

Referring to FIGS. 3 and 4, a modification is shown. The seal carrier ring 41 is formed with a recess 17 to carry to O-ring 16. Internally of the seal carrier ring is a crankshaft bearing seal 43 which seals the crankshaft. The O-ring 16, as noted in FIG. 4, is pressed against the linear seal 4 to form a fluid tight seal. Accordingly, the periphery of the seal carrier O-ring 16 is sealed by the sealing member 116 and the upper and lateral surfaces of the bearing cap are sealed by the seals 4 and 5. A gasket is positioned on the surfaces 25 and 26 of the block and bearing cap assembly and the oil pan 27 is fastened to the block and forms a seal with the gasket 29. The oil pan 27 is fastened by a plurality of bolts 30 of which two are shown in FIG. 1. Accordingly, the bearing assembly includes a seal around the periphery of the crankshaft as well as around the bearing cap preventing any leakage from the oil pan cavity externally of the engine.

The operation of the device operates in the following manner. The crankshaft 2 is journalled in the bearing shells 21 and 22 which are supported in the block 11 and the bearing cap 6. A plurality of main bearings are provided internally of the engine to support the rotating crankshaft. The seal carrier ring 1 (FIG. 1) or 41 (FIG. 3) carries two seals. The inner seal assembly 3 (FIG. 1) or 43 (FIG. 3) is pressed within the annular recess 31 and engages the crankshaft to form a seal around the crankshaft. The seal carrier ring 1 (FIG. 1) or 41 (FIG.

3) is bolted to the bearing cap 6 and block 11 by a plurality of bolts or may be merely press fitted in place. The bolts press the seal carrier ring 1 or 41 against the O-ring 16 which is received within the annular recess 17 to firmly seat the O-ring against the linear seals 4 and 5. This forms a fluid tight barrier in the block. The linear seals extend in a diammetrical direction transversely to form L-shaped seals which extend downwardly to the gasket positioned on the surfaces 25 and 26 of the bearing cap and block. The gasket 29 is positioned on the surfaces 25 and 26 forming a continuous seal between the two linear seals 4 and 5. The fastening bolts 30 fastening the pan 27 form a seal around the bearing cap and around the bottom surface of the block. Accordingly, a total seal is provided around the crankshaft, the bearing cap and the block to prevent any leakage of lubricating fluid from the engine.

The embodiments of the invention in which an exclusive property or privilege is claimed are defined as follows:

1. A main bearing and crankshaft seal assembly comprising, a housing forming a bearing support, a crankshaft, a bearing cap, bearing shells received in said housing and bearing cap forming a journal for said crankshaft when said bearing cap is fastened to said housing, lateral and horizontal interfaces between said bearing cap and housing and extending to a point adjacent said crankshaft defining seal grooves, linear seals received in said seal grooves, a seal carrier ring embracing said crankshaft, an inner peripheral seal sealing said seal carrier ring with said crankshaft, an outer peripheral seal on said seal carrier ring sealing said seal carrier ring with said bearing cap and said housing and engaging said linear seals to provide a continuous seal around the crankshaft and said bearing cap for said bearing assembly.

2. A main bearing and crankshaft seal assembly as set forth in claim 1 including an oil pan mounted under said bearing cap and housing, a gasket positioned between the mating surfaces of said bearing cap and housing and said oil pan to thereby provide a seal between the ends of said linear seals and said gasket.

3. A main bearing and crankshaft seal assembly as set forth in claim 1 wherein said seal carrier ring defines an annular recess for receiving said outer peripheral seal.

4. A main bearing and crankshaft seal assembly as set forth in claim 1 wherein said seal carrier ring defines a recess on its inner periphery for receiving said inner peripheral seal for sealing the surface on said crankshaft.

5. A main bearing and crankshaft seal assembly as set forth in claim 1 wherein said linear seals define two segments forming an L-shaped seal extending from said crankshaft to the end of the interface between said bearing cap and housing.

6. A main bearing and crankshaft seal assembly as set forth in claim 1 wherein said linear seals define two segments to form L-shaped seals, said carrier defines a recess partially intersecting the seal grooves receiving said linear seals to provide an interference fit between said outer peripheral seal and said linear seals.

7. A main bearing and crankshaft seal assembly as set forth in claim 1 wherein said bearing cap includes bolts for fastening said bearing cap to said housing to compress said linear seals.

8. A main bearing and crankshaft seal assembly as set forth in claim 1 wherein said bearing assembly defines a rear main bearing of an internal combustion engine.

9. A main bearing and crankshaft seal assembly as set forth in claim 1 wherein said linear seals define two segments forming an L-shaped cross section, said grooves receiving said linear seals extend across said outer peripheral seal on said seal ring carrier, means of defining a groove for receiving said outer peripheral seal partially intersecting the grooves of said linear seals causing an interference fit with said outer peripheral seal to thereby provide a fluid tight seal between said linear seals and outer peripheral seal.

10. A main bearing and crankshaft seal assembly as set forth in claim 1 wherein said seal on the outer periphery of said seal carrier ring defines a seal recess partially intersecting the seal grooves for said linear seals thereby causing an interference fit between said linear seals and said outer peripheral seal to assure a fluid-tight seal in said assembly.

* * * * *